(12) United States Patent
Henry

(10) Patent No.: US 7,878,393 B2
(45) Date of Patent: Feb. 1, 2011

(54) METHOD AND APPARATUS FOR DISTRIBUTION OF MONEY TRANSFERS

(75) Inventor: James M Henry, River Falls, WI (US)

(73) Assignee: MoneyGram International, Inc., Minneapolis, MN (US)

(*) Notice: Subject to any disclaimer, the term of this patent is extended or adjusted under 35 U.S.C. 154(b) by 24 days.

(21) Appl. No.: 11/608,040

(22) Filed: Dec. 7, 2006

(65) Prior Publication Data

US 2008/0140568 A1    Jun. 12, 2008

(51) Int. Cl.
*G06Q 40/00* (2006.01)

(52) U.S. Cl. .................................. 235/379; 705/35

(58) Field of Classification Search ...... 235/379–382.5; 705/35–45; 902/1–41
See application file for complete search history.

(56) References Cited

U.S. PATENT DOCUMENTS

| | | | |
|---|---|---|---|
| 5,420,405 A | 5/1995 | Chasek | |
| 5,659,165 A | 8/1997 | Jennings et al. | |
| 5,825,003 A | 10/1998 | Jennings et al. | |
| 5,956,700 A | 9/1999 | Landry | |
| 5,963,647 A | 10/1999 | Downing et al. | |
| 6,012,048 A | 1/2000 | Gustin et al. | |
| 6,039,250 A | 3/2000 | Ito et al. | |
| 6,173,272 B1 | 1/2001 | Thomas et al. | |
| 6,267,292 B1 | 7/2001 | Walker et al. | |
| 6,317,745 B1 | 11/2001 | Thomas et al. | |
| 6,488,203 B1 * | 12/2002 | Stoutenburg et al. | 235/379 |
| 6,502,747 B1 | 1/2003 | Stoutenburg et al. | |
| 6,547,132 B1 | 4/2003 | Templeton et al. | |
| 6,554,184 B1 | 4/2003 | Amos | |
| 6,609,113 B1 | 8/2003 | O'Leary et al. | |
| 6,736,314 B2 | 5/2004 | Cooper et al. | |
| 6,761,309 B2 | 7/2004 | Stoutenburg et al. | |
| 6,769,605 B1 | 8/2004 | Magness | |
| 6,814,282 B2 | 11/2004 | Seifert et al. | |

(Continued)

FOREIGN PATENT DOCUMENTS

GB    2 370 146 A    6/2002

OTHER PUBLICATIONS

MoneyGram International Inc. MoneyGram® eMoney Transfer. Printout of computer screen images of product electronic commerce documents. 1995. 109 pages.

*Primary Examiner*—Thien M. Le
*Assistant Examiner*—Christle I Marshall
(74) *Attorney, Agent, or Firm*—Dorsey & Whitney LLP

(57) ABSTRACT

A method of performing money transfer send transactions begins with receiving registration information from a customer, including customer identification and qualification information and payment source identification and performing verification of at least a portion of the identification and qualification information and the payment source identification and upon sufficient verification building a distribution profile. The method proceeds by receiving from the customer and storing in the distribution profile send transaction specifications for staging each of one or more proposed send transactions, and receiving a send initiation instruction with associated customer authentication data and responsive thereto identifying a distribution profile and at least one send transaction specification to be executed. Responsive to the send initiation instruction, the method verifies the authentication data and the current status of the payment source identified in the distribution profile and upon sufficient verification, initiates a send transaction according to the at least one send transaction specification.

34 Claims, 7 Drawing Sheets

U.S. PATENT DOCUMENTS

| | | | |
|---|---|---|---|
| 6,827,260 B2 | 12/2004 | Stoutenburg et al. | |
| 6,886,742 B2 | 5/2005 | Stoutenburg et al. | |
| 7,120,608 B1 * | 10/2006 | Gallagher et al. | 705/68 |
| 7,258,268 B2 | 8/2007 | Steiger, Jr. | |
| 2003/0083987 A1 * | 5/2003 | Stoutenburg et al. | 705/39 |
| 2003/0110129 A1 | 6/2003 | Frazier et al. | |
| 2003/1169881 | 9/2003 | Niedermeyer | |
| 2003/0208439 A1 | 11/2003 | Rast | |
| 2003/0222135 A1 | 12/2003 | Stoutenberg et al. | |
| 2004/0143552 A1 | 7/2004 | Weichert et al. | |
| 2004/0177014 A1 | 9/2004 | Cowell | |
| 2005/0209958 A1 * | 9/2005 | Michelsen et al. | 705/39 |
| 2006/0054683 A1 | 3/2006 | Michelsen et al. | |
| 2006/0191994 A1 * | 8/2006 | Steiger, Jr. | 235/379 |
| 2006/0206421 A1 * | 9/2006 | Knapp | 705/39 |
| 2007/0005498 A1 * | 1/2007 | Cataline et al. | 705/42 |
| 2007/0124242 A1 * | 5/2007 | Reis, Jr. | 705/39 |
| 2008/0033877 A1 * | 2/2008 | Blair et al. | 705/44 |
| 2008/0114697 A1 * | 5/2008 | Black et al. | 705/67 |

* cited by examiner

Enter Authentication 252
-PIN
-PSW
-Question: abc def ghi
-Answer:
-Token/Biometric
(instructions for entry)

Planner Tool 254
Available Funds
Total deployed amount
Send1 $ _____ % _____
Time1
Fees1
Subtotal
Send2 $ _____ % _____
Time2
Fees2
Subtotal
...
Total
Balance of Funds after Above

Account History 256
-select time frame:
__/__/__ to __/__/__
-select recipient
-delivery mode
____ e-mail
____ regular mail

Account Management 258
-Update TSR
-Add TSR
-Change authentication
-Other

New Template Profile option on Profile Information Screen

510

520

Sender's information fields

FIGURE 6

| Change or Other Action Requested | Permitted Portal(s) and Conditions |
|---|---|
| Authentication information change | CSR; IVR with biometric authentication; agent viewing picture ID |
| New send TSR | CSR, web site, agent; regular authentication |
| Existing TSR amount change <100% | Any portal; regular authentication |
| Existing TSR amount change >100% | Any portal; three-factor authentication |
| Recipient change | Any portal; regular authentication |
| Delivery mode change | Any portal; regular authentication |
| Bill pay addition | Any portal; three-factor authentication |
| Biller pay amount change | Any portal; regular authentication |
| Biller pay stop | Any portal; regular authentication |

METHOD AND APPARATUS FOR DISTRIBUTION OF MONEY TRANSFERS

BACKGROUND OF THE INVENTION

The present invention relates to an apparatus and methods for transferring money or monetary value. More specifically, the present invention relates to a system for managing data and communications to specify, fund and execute multiple money transfers for a customer.

It is increasingly common for finds to be transferred electronically. This can occur from individual to individual or from business to business or between an individual and a business. The transfers may occur within one country or across borders, from one country into another, and thus may involve a currency change.

For individuals, such transfers are often handled as one-time transactions funded with cash. In many cases this is because the individual sending the funds lacks an account at a bank or a credit card. Thus, the funds for each transfer must be provided in cash (or equivalent), paid separately before each transaction.

This one-at-a-time, cash approach is not efficient for either the sending individual or for the bank or non-bank financial institutions involved in money transfers. One answer is for the individual to develop a banking relationship and get an account for writing checks or using home banking to make payments. However, the sender's individual situation does not always permit this. Moreover, checks and home banking forms of payment may not work well when the payment recipient is an individual without an account and when a currency change is involved. Non-bank financial institutions have well-developed solutions for doing money transfers across borders, where a currency change is involved and also for delivering payments in cash or other useful forms to a recipient. However, these systems were developed primarily for single, separate transactions funded and executed one at a time.

Moreover, the systems within the institution may use separate data processing platforms that have evolved around the particular requirements of certain agent groups or types of transactions and associated risks. The result is that some transactions or particular varieties of such transactions, e.g., forms of delivery of payout, are not available from all platforms.

Thus, there is a need for improved money transfer systems and methods that assist an "unbanked" sender (customer) in making money transfers and to provide a non-bank financial institution with procedures that minimize the amount of customer and personnel time per transaction and that are otherwise economically efficient.

BRIEF SUMMARY OF THE INVENTION

One embodiment is a method of performing a money transfer send transaction that begins with receiving registration information from a customer, including customer identification and qualification information and payment source identification and performing verification of at least a portion of the identification and qualification information and the payment source identification and upon sufficient verification building a distribution profile. The method proceeds by receiving from the customer and storing in the distribution profile send transaction specifications for staging each of one or more proposed send transactions, and receiving a send initiation instruction with associated customer authentication data and responsive thereto identifying a distribution profile and at least one send transaction specification to be executed. Responsive to the send initiation instruction, the method verifies the authentication data and the current status of the payment source identified in the distribution profile and upon sufficient verification, initiates a send transaction according to the at least one send transaction specification. There are a corresponding system and software that implement the method.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 3 is a set of exemplary simplified customer interfaces useful in initiating a money transfer transaction and managing a customer account.

FIG. 6 is an example of a security filter decision matrix for use with the present system.

DETAILED DESCRIPTION

Basic Elements of System. As discussed above, a non-bank financial institution (NBFI) may have-well developed systems for making certain money transfers and wish to expand their use. One important form of these money transfers is a transfer from a sender individual to another individual, which may be set up in a first, staging phase and completed in a second, fulfillment stage. (See, e.g., U.S. Pat. No. 6,408,203, titled "System And Method For Performing Money Transfer Transactions"; see also U.S. Pat. Nos. 6,502,747, 6,761,309). These transfers are often cross-border transactions where currency exchange and/or regulatory compliance components are necessary parts of the system. (See co-pending application Ser. No. 11/068,090, titled "Method And Apparatus For Money Transfer," filed Feb. 28, 2005.) To help control risk and because, for many senders, cash is their only form of finds, the money transfer transactions are usually "one-off." They are initiated only after the sending NBFI or its agent receives cash for a particular send transaction.

Often the NBFI has a variety of transfer types and payout options that the sender can select to suit the sender's desires and to accommodate the recipient. These are useful to the sender but also add complexity to the transaction if the parameters are re-specified with each transaction. After specifying the transaction parameters, the sender makes a cash payment to cover the amount transferred plus fees, and then the NBFI executes the transfer to the recipient. Some NBFIs offer as part of their money transfer system bill payment to specific billers with whom the NBFI has a relationship. Such bill payment transactions are also typically initiated with a cash payment and thus are "one-off," too. For some NBFIs there are multiple data processing platforms that have evolved to handle different money transfer situations. Certain varieties of money transfers (including bill payment) may be available on only one or less than all platforms. Thus, a cash-based customer who can only use one platform may not have access to all the NBFI's money transfer options.

Recently, NBFIs have made arrangements that permit certain transactions performed on-line to be funded with funds from a bank account that is set up for on-line transactions. See e.g., www.emoneygram.com/eMoneyGram/index.do. However, that is only helpful for senders who are able to set up such a bank account relationship. NBFIs desire to expand their business by providing additional services, available to more customers. The system described herein provides an extension and improvement of existing systems that gives NBFI customers greater control and convenience in making multiple money transfers. This permits the NBFI to build more continuing and broader customer relationships.

Figure 1:
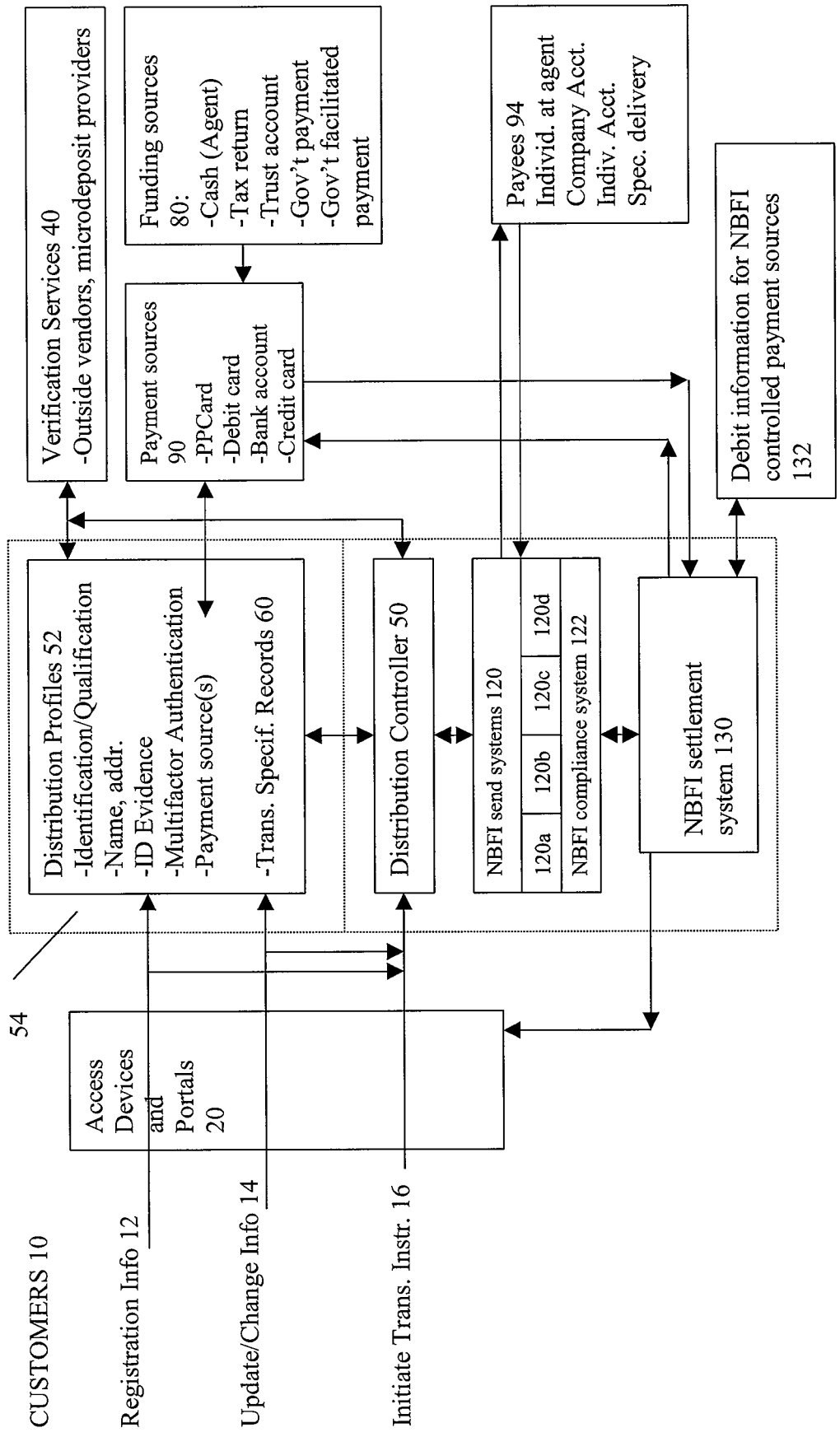
FIG. 1 is a schematic block diagram of a system for performing money transfer transactions.

FIG. 1 is a schematic block diagram of a system 100 for performing distribution of money transfer transactions and its surrounding environment. The main participants in the system are the customers 10 (typically individuals, but also small businesses) and a non-bank financial institution (NBFI) that already has effective money transfer systems in operation at its data center 102 and wishes to extend their utility and attract additional customers. Part of the NBFI's system 100 is one or more customer access portals 20 that provide access to one or more variants of the NBFI's services. These may include one or more customer service centers with customer services representatives (CSRs) to handle telephone calls from customers and to access relevant data at the NBFI's data center 102. (The customer service center may be a single geographical location or a number of locations networked together to provide sufficient CSRs, with appropriate language capability, to effectively handle the contacts initiated by customers.) Also used to access the NBFI's system are NBFI "agents", who are businesses independent of the NBFI that work under contract with the NBFI and have agent terminals with communication links to the NBFI to serve as customer contact points for send transactions and also to act as contacts points for money transfer recipients. Other devices or portals for accessing the existing NBFI data center 102 systems may include websites accessible by personal computers, mobile computers, mobile phones and PDAs or interactive voice response systems, all communicating with the NBFI's CSRs and/or data center 102. In the present system 100 the access portals 20 communicate with a transaction distribution controller 50 running at the data center 102, which interacts with distribution profiles 52 built for customers 10 and their range of money transfer transactions.

Other participants in the system 100 are outside verification services 40 and various funding sources 80. The verification services 40 may be used to help ensure the accuracy of registration information from customers 10. For example, for confirming accuracy of a name, address, telephone number, or other information an individual may provide, a verification service that has aggregated and correlated large amounts of publicly available information may be consulted. Another form of verification service is one that checks the status of bank accounts or that performs a micro-deposit in an account (e.g., a few cents) and determines if a party claiming that account can accurately report the amount of the deposit, thereby showing accountholder status. A further form of verification may involve OFAC or other listings prepared by governments.

The funding sources 80 are those entities that provide money paid to customers 10 that is credited in favor of the customer at one or more payment sources 90 that are linked to the data center 102 for use by a customer. The credited funds then become available for the customer 10 to access and apply to send transactions and associated fees. Funding sources 80 may include, for example, agents receiving cash from (or for) a customer, providers of tax return loans, payroll providers, trust account payors, and government entities that make government (i.e., social security) or government facilitated (e.g., child support) payments. For some funding sources 80 the funds may be provided through the ACH system to the customer's payment source 90.

Payment sources 90 may be services or facilities operated by the NBFI. Alternatively, there may also be third party payment (as opposed to funding) sources 90, such as bank accounts and credit or debit card accounts with companies that have contractual or network relations with the NBFI. A further class of system participants is payees 94, recipients of a send transaction, which may be individuals or businesses. These recipients may receive a money transfer in any of the several ways offered by an NBFI and its agents, e.g., cash or money order at an agent, company or personal bank account deposit, home or office delivery, etc.

In the system as shown in FIG. 1, customers 10 who wish to take advantage of the system set up a distribution profile 52 in a database 54 and then provide instructions to perform the transactions enabled by that profile 52. The first step in making a distribution profile 52 is for the customer to provide registration information. This is basic personal identification information, e.g., name and address, telephone number and also qualification information, which is a specified form of identification sufficient under applicable regulatory rules to permit the individual to make use of at least the basic level of money transfers, possibly also higher levels. In addition, registration requires multifactor authentication information and identification of at least one payment source 90 for funding transactions. This may be a prepaid or debit card that the NBFI is authorized to issue to the customer and for which the NBFI has made funding arrangements. This is advantageous, because the NBFI will itself have records of the status (including funds balance) for the card and will also have a relationship with the funding source 80. However, as noted, the payment source 90 also may be a third party credit or debit card, a bank account or similar sources administered primarily by others but accepted as a payment source 90 for customer transactions. In one embodiment, the distribution profile 52 identifies a primary payment source 90 and one or more secondary payment sources, which the NBFI may choose to use for payment under certain circumstances.

During registration or thereafter, the customer 10 selects from among the available send transaction options and parameters and specifies for inclusion in the distribution profile 52 one or more transactions that the customer wants to initiate, preferably transactions that the customer expects to initiate more than once. These are defined in transaction specification records (TSRs) 60 that specify the recipient, the selected delivery options and other parameters relevant to defining one or more money transfer transactions supported in the NBFI send system 120. The transactions may be selected from among those offered by the NBFI through one or more of multiple transaction processing platforms 120*a*, 120*b*, 120*c*, 120*d* that the NBFI has developed for conventional one-off cash transactions or other existing transactions types initiated from particular agent groups, or for particular transaction types or technology platforms.

The present system 100 uses certain existing components of the NBFI data processing systems 102, including the existing send systems 120 (e.g., legacy platforms 120*a*-120*d*) and its compliance system 122, which addresses the regulatory aspects that vary by transaction amount and jurisdictions governing sender, recipient, any agent involved and/or the NBFI. Thus, the TSRs 60 are assembled so that the transaction specified will normally satisfy the requirements of the NBFI compliance system 122 that will be applied when the TSR 60 is initiated as a live send transaction. Further, the system 100 may make use of the existing NBFI settlement system 130 to send and receive payments due to or owed from agents, billers, funding sources 80, payment sources 90 and other participants, although some modifications may be required to accommodate fee structures, timing and risk allocation that arise from the unique circumstances of the present system. The system may also include a feed of debit information 132 for NBFI controlled payment sources that links to the settlement system 130. The transaction distribution controller 50 serves as the coordinator for exchanging information with customers 10 and preparing the transactions it processes to make use of the existing components of the NBFI data center 102.

Figure 2:
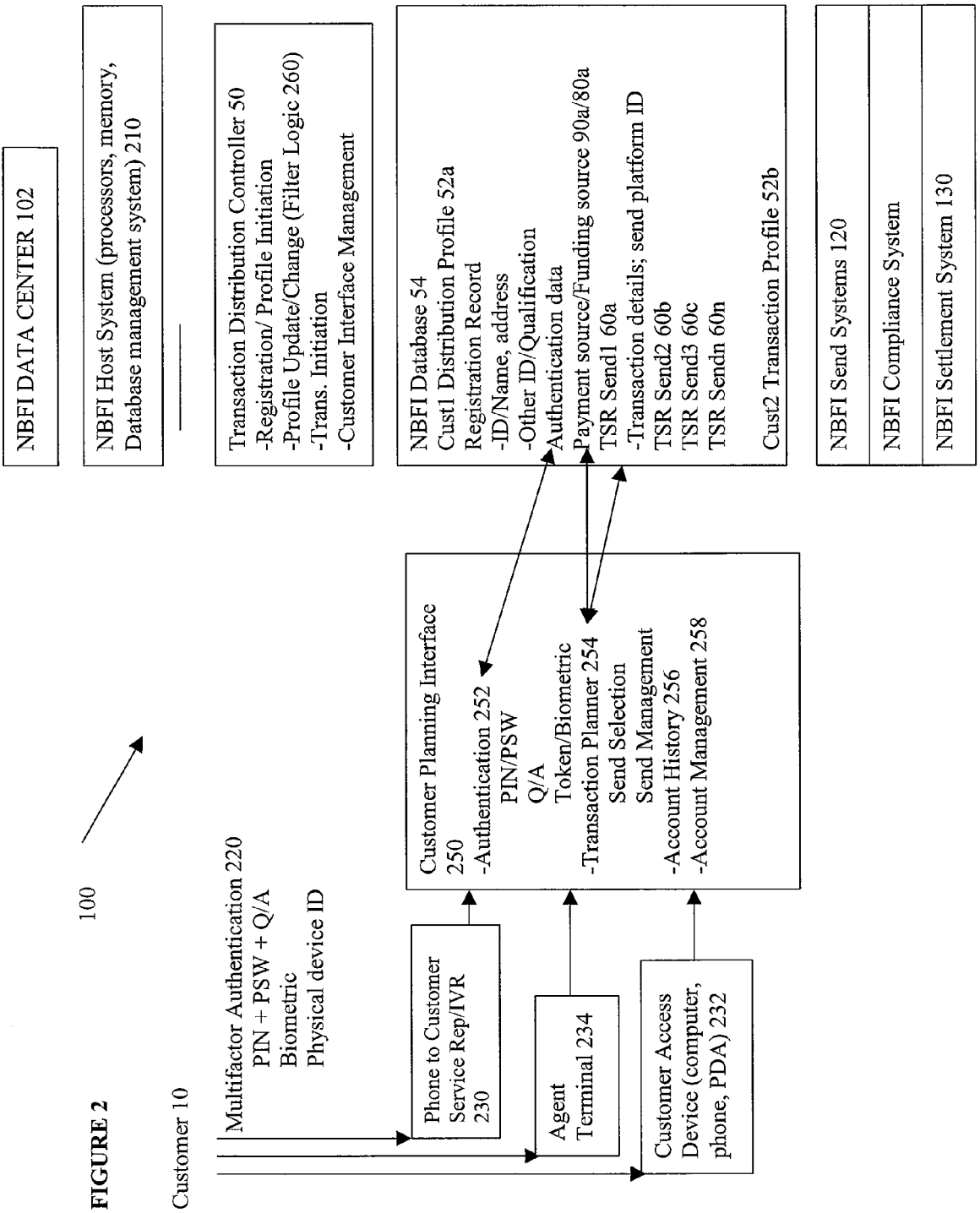
FIG. 2 is another schematic diagram showing the components used in a money transfer system.

Component Description. Referring now also to FIG. 2, a customer 10 can use a number of access portals 230, 232, 234 to deliver information to the data center 102, i.e., to input and receive information relevant to transaction distribution. A first portal for customer use is a telephone for contacting a CSR 230 at a call center (or network). The CSR may be one of several working at the center (or network) and receiving communications from customers 10 using a telephone. The telephones may be spread over the geography served by the NBFI, as long as a communication link to the call center 230 can be established. For example, the customer 10 may reach a CSR from a home telephone or mobile telephone or use a dedicated telephone located at an NBFI agent office. The CSR is typically equipped with a terminal that provides access to records in the NBFI data center 102. Not only does the terminal provide the means to get the customer's relevant registration and other information keyed into the data center 102, the terminal can be provided with templates and other interfaces that will guide the CSR through the registration process and TSR building or whatever customer interaction is at hand and can be configured with CSR interfaces to help ensure that in the customer interchange the CSR collects and properly stores in the data center 102 all necessary registration, transaction or other information.

In addition to communication with a live CSR who provides input at a terminal that connects to the NBFI data center 102, the customer 10 using a telephone for access also may be handled by an interactive voice response (IVR) system, in effect, an automated CSR 230. This IVR access portal leads the user through an information collection protocol designed to complete the registration process or other interaction. The IVR system can understand the necessary vocabulary or ask for certain information to be keyed in on a telephone or other device keypad.

A further access portal is a personal computer 232 that connects to an NBFI website via the internet or other communication channel or otherwise electronically communicates with the NBFI data center 102. Here, the personal computer (which may be owned by or merely be accessible to the customer 10) can receive user interface screens provided by the distribution controller 50 and configured to collect registration or other information. These screens capture and return to the NBFI data center 102 a customer's responses. Somewhat similar is portal access based on a personal computer or other agent terminal device 234 operated at an agent location. As with a CSR, the NBFI via data center 102, including distribution controller 50, or by terminal configuration, can provide templates and other interfaces that will guide the agent through the registration or whatever customer interaction is needed. The screens can be configured to help ensure that in the interaction the agent collects and properly stores in the data center 102 all necessary information from the customer. One benefit of the agent terminal portal is that the agent can directly examine customer documents, such as picture ID, passport or whatever else may be required from a compliance viewpoint and by its input inform the NBFI data center 102 of the sufficiency of the documents presented. This may be more difficult to do with other portals, at least without special imaging, reading and/or authentication devices.

It is anticipated that, in addition to personal computers, customers 10 may also use PDA's and other personal communication devices 232 with internet or text message services to exchange registration or other information with the NBFI data center 102, based on input screens or other prompts that guide the customer through the data input transaction and are suited to a smaller format display. Thus, the processes for collecting registration or other information described herein can be carried out in a variety of ways on a variety of devices. The interactions lead to the construction of a customer distribution profile 52 and related records that are stored in the database 54 of the NBFI data center 102 and use of the profiles 52 and records to initiate send transactions.

Customer Interactions. The customer interactions with the NBFI system 100 may be described in three categories: (1) initial registration to establish a distribution profile 52; (2) updates and extension of the distribution profile 52; and (3) initiating send instructions. These interactions need not be separate and may be combined in whatever ways the CSR/IVR 230, the other access portals 232, 234 and the transaction distribution controller 50 are configured to handle. The interactions are explained with further reference also to FIG. 2.

Initial Registration. To begin use of the system, the customer 10 registers to establish a distribution profile 52 in database 54. This distribution profile 52 becomes the staging platform for later send transactions of various kinds specified by the customer 10. The content of the customer profile 52 and the use of the information stored in it permit the customer 10 efficiently to set up and initiate a range of transactions that are permitted and enabled according to the qualification and other information assembled in the customer profile 52. The general content of a distribution profile 52 (e.g., profiles 52*a*, 52*b* in FIG. 2) is in three parts, as follows:

Identification/Qualification—This is the basic personal information that identifies the customer 10, such as name and address, optionally a telephone number. The nature of money transfer regulations is that only smaller amount transactions can be done with more limited identification. Larger transactions require additional identification in order for the customer 10 to be considered qualified to undertake such transactions. The NBFI must collect the available regulatory qualification information as part of its compliance. For example, the transaction size levels and identification qualifications may be as follows:

$0.01 up to $A: name and address $A up to $B: qualification/compliance data for the level below, plus photo ID, defined by ID Type, ID no., ID issuer and Legal ID, $B up to $C: qualification/compliance data for the level below, plus occupation, any $3^{rd}$ party information and other compliance information.

For example $A may be $250; $B may be $500 and $C may be $9999.99. With increasing government oversight of money transfers, there may be multiple and overlapping compliance rules and requirements that apply to a transaction, applied according to sender location, recipient location and location of agents or other transaction participants.

Thus, a customer for small amount transactions may provide identification by telephone while one who wishes to do larger value transactions will provide a photo ID, such as drivers license or passport, and/or additional information of interest to regulators. This may need to be done at an agent, with the agent's review of the credential and the resulting data entered from an agent terminal. With higher levels of qualification/compliance the distribution profile grows in power and also opens up transaction opportunities for the customer and NBFI.

The NBFI will want to (and may be required to) verify at least a portion of the identification/qualification information. This may be done by transmitting the information to various private parties that have databases of such information or the ability to investigate. For example, verification services that have public record collections may confirm name, address and telephone number information. Other verification services may be able to confirm the active status of or accountholder name on bank accounts and credit cards, or other funding sources 90 that a customer identifies. Where possible, this verification is done in real time, in a single customer-system interaction, but may also require multiple interactions. Verification may also involve submitting the information to a government agency or checking a government provided database.

Authentication—One purpose of a distribution profile 52 is to allow the customer 10 to initiate transactions easily. With cash no longer a prerequisite for a transaction, and assuming a customer payment source associated with a transaction has an active status, including available funds, a primary issue is authenticity of instructions. Thus, to insure that only the customer that established the distribution profile 52 can provide valid transaction initiation instructions and ensure only the customer can modify the profile 52, it is important to have customer authentication data established during registration. For security, the present system uses multifactor authentication. Thus, the authentication section of the distribution profile 52 includes at least a personal identification number (PIN) and a second element, such as password or a question-answer pairing. In one embodiment, authentication data taken in at registration may include a biometric, such as codes or data derived from a fingerprint or a retinal scan, where the customer will have the ability to present that code/data later as part of his/her instructions. In another embodiment, the system may use the attributes of a physical token, such as a code number generator or a digital signature stored in a cell phone, PDA or similar device. The registration process prepares the system to perform a multifactor authentication check as a gateway to any transaction initiation or profile update. Only if the authentication credentials required by the distribution profile 52 are presented correctly will the distribution profile be available for use or updating. The multifactor authentication check may comprise checking both of two required factors (regular authentication), checking all of three or more required factors, matching any two of three or more factors, checking at least one required factor (e.g., a biometric, when available at a portal) and a second factor selected from two or more factors, or other combinations of available authentication factors. The factor combinations found most reliable can be derived from the system's ongoing analysis of fraud experience.

Transaction Staging Records—A third part of the customer distribution profile (e.g., 52a, 52b in FIG. 2) is the set of transaction specification records or TSRs 60 that are used to stage transactions for efficient execution. As part of registration, the customer 10 is presented a menu of transaction types and parameters offered by the NBFI under the distribution controller 50. This menu may include a variety of transaction options from the two or more sending platforms 120a-120d that the NBFI data center 102 already supports. These may include, for example: individual to individual money transfers, where the payout is by cash or money order and where agent pick-up or courier delivery may be specified; money transfers to a bank account; money transfers to a debit card; money transfers for bill payment; and any other transfer operation the NBFI supports and for which the sender qualifies by the identification/qualification information in the profile record 52. Thus, while not necessarily visible to the sender, the NBFI may execute the transaction on one of its existing sending platforms 120a-120d based on the transaction specification acceptable to that platform.

Each TSR 60 that the customer builds includes the parameters defining how that transaction is to be executed. For example, one TSR 60a may include the basic data needed for a send transaction to an individual, such as a send transaction to a recipient-spouse at one address or agent location. A second TSR 60b may specify the parameters for a send transaction to a recipient-grandparent at another address or agent location. The data needed to stage such transactions are those required by the NBFI's existing send systems. This typically includes recipient name and location. It may also include a form of payment and a recipient security question. In some recipient locations a customer may be able to specify a recipient deposit account or delivery instructions tailored to the recipient. Preferably, the initial TSR 60 information includes no send amount, because, as will be seen, that amount can be set flexibly at the time a transaction initiation instruction is provided. However, if desired, a default send amount may be specified. All other transaction details may be provided; these may involve varying exchange rates and fees, such that the final send amount and any associated fees are the only elements of the transaction that need to be determined to make the send transaction ready for execution. Further, the TSR 60 may contain or have access to all compliance information relevant to the transaction it contemplates, so that when the TSR is used to make a live send transaction, compliance is, wherever possible, already addressed.

The TSR 60 may include an identifier for a particular send platform that will handle the send transaction. The system provider may make that selection after receiving the TSR information. If the TSR 60 defines a transaction that may be handled by more than one existing platform, the TSR 60 may specify a first platform and a secondary platform to provide redundancy in case of system problems or to allow the NBFI to direct the transaction for processing based on network traffic conditions or cost factors (e.g., communication costs, network fees) not visible to the senders.

When an NBFI has bill payment available, one or more bill payment TSRs may be set up in the distribution profile 52. These identify the biller, for example, a utility, car loan creditor, etc. If the payment is of a consistent amount, the amount of the bill payment or a default amount may be specified; otherwise, this amount is determined at the time of transaction initiation.

In some instances, where the customer 10 has regular payment plans or obligations, the timing and number of the transactions can be specified with the other TSR details to define a payment sequence, e.g., bill payment by the first of the month or the fifth of a month, with a sequence of ten monthly payments. This portion of a TSR 60 can become the basis for transaction initiation that is automated. In this case, the TSR 60 may provide a complete payment plan for addressing a customer debt. Where the biller works closely with the NBFI, the NBFI can guide the payment sequence TSR to fit biller requirements for a payment plan, where the sender is willing and able to meet these.

Updates and Changes Once a customer 10 has established a distribution profile 52 and becomes comfortable with using the system 100, it is expected that a second form of interaction may occur to update and change the content of his/her distribution profile 52 (i.e., account management by the customer). Here it is important to ensure that only the customer 10 associated with the distribution profile 52 makes updates and changes, so the authentication information already in the distribution profile 52 is used to permit or deny access to the profile records to be updated. The interaction begins with a demand for authentication information. Once this is satisfied, the customer 10 may proceed to add a new TSR 60, e.g., a new send transaction to an individual, or an additional or different bill payment transaction. Also, the customer 10 may want to change an address, send mode or some other parameter of an existing send TSR 60. The customer 10 may use any access portal 230, 232, 234 to apply for updates and changes. However, there may be only certain portals where certain kinds of updates may be made. This may be configured into security filter logic 260 in the distribution controller 50 (see FIG. 2) that permits or prevents distribution profile changes of certain kinds, based on the access portal by which the proposed update or change is presented to distribution controller 50 and/or on the type of authentication that is set up with a distribution profile 52. For example, a change in a recipient address might be made only via a CSR interaction or with a biometric provided, if the system operator felt that such a change coming from an agent terminal might involve some risk of being unauthorized, notwithstanding the authentication procedures.

As seen in FIG. 6 the security filter logic 260 may be implemented in the form of a matrix of permitted or excluded actions, based on the portals and authentication information presented. This logic may be adjusted over time as experience with fraud shows where a portal and/or authentication procedure or information with a higher level of fraud detection ability may need to be employed to execute certain distribution profile management actions found to involve fraud risk. FIG. 6 shows an example of security filter logic 260, whereby the left hand column 610 enumerates a number of change or other action requests that a customer may make and the right hand column shows the combination of portal and authentication that is required to permit the change (or other action) to be made. As may be seen, a change in authentication information may have more stringent requirements than a simple change in a send transaction amount. A change in transaction amount that is less than 100% of the previous transaction to the same recipient may have less stringent requirements than a change of more than 100% of the previous transaction to the same recipient.

The ability to expand and change the set of TSRs 60 that stage transactions in the customer profile 52 has benefits for both customer 10 and NBFI. The customer 10 has greater ability to distribute payments, similar to the options available to a bank checking account holder (perhaps superior to such options in the case of cross-border transfers). The NBFI has more transactions, with the opportunity for more fees, whether these are collected from the customer 10 or from a money transfer recipient, such as a biller.

Transaction Initiation. Much of the convenience of the present system 100 comes from the flexibility provided to the customer 10 to make payments. With a distribution profile 52 in place that includes all or a substantial portion of the money transfers (e.g., to family members) or bill payments (e.g., to utilities, car financers, mortgage companies, lenders) comprising his/her key financial activities, the customer 10 can use the access portals of the system 100 to initiate many of these remotely, by working with a telephone, or PC or other portal access device. No visits are needed to agent offices. Transactions may be initiated without the need to fit agent business hours. The customer 10 can use a telephone portal to contact a CSR, for example, and with appropriate authentication and adequate funding in the customer's payment source 90, cause the CSR to effect one or more money transfers already staged in the TSRs 60 in the customer's distribution profile 52. Acting on authenticated instructions, the CSR can set these up to be initiated immediately or at a later time selected by the customer 10.

If the customer registration process includes staging some money transfers as payment sequences with automatic time triggers built into the TSRs 60, the customer 10 need take no additional initiation actions. The transaction distribution controller 50 is configured to monitor the stored initiation times in all distribution profiles 52 and take action to initiate the transfer transaction as provided by the selected date and/or time parameters in the TSR 60. Thus, the controller periodically examines the timing parameters (e.g., FIG. 3, Time1) in profiles 52 and may initiate a send in response to these, assuming funds are present.

Each transaction must pass through the NBFI's compliance systems 122. This may include checking details of the transaction with a government database, such as OFAC, which is intended to identify transactions by persons or organizations identified as terrorists or involved in illegal activities. Other compliance processing is directed as needed, based on transaction amount and applicable jurisdictions.

Customer Planning Interface. FIG. 2 shows a feature that is enabled by the system 100 and may be useful to customers 10. When the access portal for transaction instructions is a personal computer or other device with a suitable electronic display, the distribution controller 50 may offer the customer 10 a transfer instruction planning interface 250. On a larger display, this might be accommodated in one screen. On a mobile phone or other similar device with a small display, the content of the interface may be presented in a sequence of several screens. As generally indicated at interface 250 in FIG. 2 and FIG. 3, the interface authentication component 252 first calls for authentication data, e.g., with a PIN, password, a question-answer pairing, and/or token or biometric. Instructions and response formats may be provided as shown at 252 in FIG. 3. This interface is further configured with a transaction planner component 254 to allow a customer 10 who has satisfied authentication tests to receive a transaction planner screen display that shows the staged transaction options established in the TSRs and allows selection among these. Because each selection involves specifying at least a send amount and possibly a currency exchange issue or a fee, further screens may present the user with the results of his/her selections, by transaction and cumulatively.

Further, as seen in greater detail in the sequence of screen content examples in FIG. 3, the interface 250 with an interactive planner tool screen 254 may permit a customer 10 to view the funds available in the payment source 90 linked to the distribution profile 52, and/or to enter a total amount of funds the customer wishes to deploy and then allocate these to two or more transactions defined by TSRs 60. In one embodiment, the customer 10 may allocate selected percentages to selected send transactions, with the interface showing the resulting send amounts and any associated fees. The customer 10 also may specify some fixed dollar (or other currency)

amounts and percentages of available funds and again see the resulting send amounts, including exchange rates and any associated transaction fees. Thus, the system provides customer 10 a distribution planning tool (akin to a mini-spreadsheet) that assists judgments as to the multiple possible transactions supported by the distribution profile 52 and coordination between them. In particular, the interactive planner tool may perform calculations based on percentages, fixed amount allocations, and transaction fees and exchange rates that become known, so that actual cost of one or more sends is presented with sub-totals and totals. This helps facilitate consistent instructions reflecting customer desires.

The interface as seen in FIG. 3 can further offer an initiation time selection by transaction (e.g., Send1 Time1, Send 2 Time2). If the customer 10 has money transfers to be made at different times, these can be specified when send instructions are finalized. In the case where the NBFI has its own pre-paid card as a payment source or otherwise has available balance information, the NBFI can show in a planner tool screen 254 (FIG. 3) a customer balance at the payment source 90 remaining after the selected transactions are paid for. In one embodiment, the interface may permit the customer 10 to deploy the entire available balance and show the result if that entire balance were to be used and allocated by percentage and/or dollar (or other currency) amount. Each of these facilities helps the customer 10 exercise greater control over his/her available funds and to coordinate among the transactions (which can now be dealt with as a group) and address any currency change issues identified during instruction formulation that might make certain transactions more or less favorable than the customer 10 anticipated before receiving the planner 254 information.

Account History; Account Management. Another aspect of the interface as shown in FIG. 3 is the option for a customer to review account history or to initiate account management features. Account history may be of interest to a customer in making decisions about future transfer transactions. Using an account history interface screen 256 (FIG. 3), the system 100 can provide the ability to select a view of transaction history by time frame or by recipient or by a combination of both. The customer 10 may also select a delivery mode for additional history information, such as e-mail or a statement printed and delivered by regular mail. With an account management interface screen 258 (FIG. 3), the system 100 offers the customer 10 the option (described above) to update a TSR 60 by changing one or more of its parameters, or to add a new TSR 60 or delete one. To the extent a customer 10 wishes to change the data used for authentication, that may be initiated here as well.

Funding the Payment Sources. As noted above, the system 100 contemplates that a customer profile 52 will be based on use of one or more payment sources 90. As also noted, a favorable payment source 90 for an NBFI is a prepaid card that is under the NBFI's control. In some cases, the NBFI is permitted to issue the card to customers 10. In other cases, the NBFI will work with another issuing party, with the issuing party's brand or a co-branding or private label arrangement. In any event, the NBFI controlled card is favorable as the payment source 90, because the crediting and debiting can be done with account records kept by the NBFI. For example, NBFI XYZ Company may issue the XYZ prepaid card. This card can be funded by an initial cash payment made by the cardholder or by another funding source 80 for the cardholder. The amount funded then becomes available for use wherever the card is accepted. NBFI XYZ Company may wish to use the card as a funding source for money transfer transactions under the present system 100. NBFI data center 102 through a data exchange with its settlement system 130 then keeps track of the initial balance and all debits, whether from use of the funds for money transfers instructed using a distribution profile 52 or from other permitted uses, such as ATM withdrawals, or retail purchases at participating merchants. The NBFI data center 102 will then have an exact or approximate view of the account status, including balance available, on the NBFI prepaid card as payment source 90, depending on the speed of transaction processing. This permits the NBFI to check account status to advise a customer 10 as to payment source 90 funds available for transaction instructions using the customer's distribution profile 52 and to provide a transaction planner interface 254 as described above that permits allocation of funds known to be available.

On the credit side of a prepaid card as payment source 90, when the NBFI works with an entity that is a regular funding source 80 for the customer 10, the NBFI can coordinate regular credits from funding source 80 to payment source 90. These credits may be based on employer payroll or other payments to an employee-cardholder, or based on regular payments from a known source such as a trust account, a government payments program, a government-facilitated payment program (e.g., child support) or from a tax refund. Thus, the NBFI data processing system may receive data feeds from funding sources 80 or transactions from the ACH system, with information on payments to be credited to the card and applies those credits to replenish the balance of a payment source 90.

The NBFI may also work with other payment sources 90. It may permit the distribution profile 52 to designate a bank account as a primary or secondary funding source. It may permit a credit card to be designated as a secondary funding source. Each of these other funding sources 90 has different risk issues. It becomes a matter of the NBFI's risk calculations as to what payment sources 90 are acceptable for linking to the distribution profile 52 and using for any particular requested transaction.

Send System. Once a transaction is initiated by a customer 10, it is passed on to the NBFI send system 120. As noted, the present system 100 is most effective if a transaction initiated from a customer distribution profile 52 can be formulated by the distribution controller 50 and then, with data from the applicable TSR 60 and supplemented with the customer initiation instructions, be passed to one of the NBFI's existing send systems 120a-120d with little or no deviation from the NBFI's data processing for send transactions that may be generated from agent cash transactions or web-based credit card transaction or other customary sources of money transfer transactions where the same transaction platform is used.

As with distribution profile updates, portal-based control over transaction initiation may be configured into security filter logic (similar to that in FIG. 6) that may permit or prevent transaction initiation of certain kinds, based on the access portal by which the proposed transaction initiation is presented to distribution controller 50 and the authentication information presented. For example, a larger value transaction might be made only via a CSR interaction, if the system operator felt that such a transaction coming from an agent terminal might involve an unacceptable risk of being unauthorized, notwithstanding the authentication procedures. As noted above, the security filter logic can be implemented in the form of a matrix of actions and permitted or excluded transaction types, by portals and authentication. This logic may be adjusted over time as experience with fraud shows where a portal with a higher level of fraud detection ability may need to be employed to execute certain transactions found to involve fraud risk. The matrix format makes it simpler to adjust the system parameters.

Settlement. The NBFI's settlement systems 130 may be used for paying the various parties involved in a transaction other than the recipient. This may include payments to agents for a role in a send or receive transaction initiated by the system, payments to billers initiated by the system, or placing debits on credit cards where a payment source 80 is a regular third-party issued card. These settlement payments may involve ACH transfers or connections to various other payment networks. The settlement activity is largely conventional for the NBFI, other than the distribution transaction that gave rise to it, because the distribution profile uses existing send systems.

Figure 4:
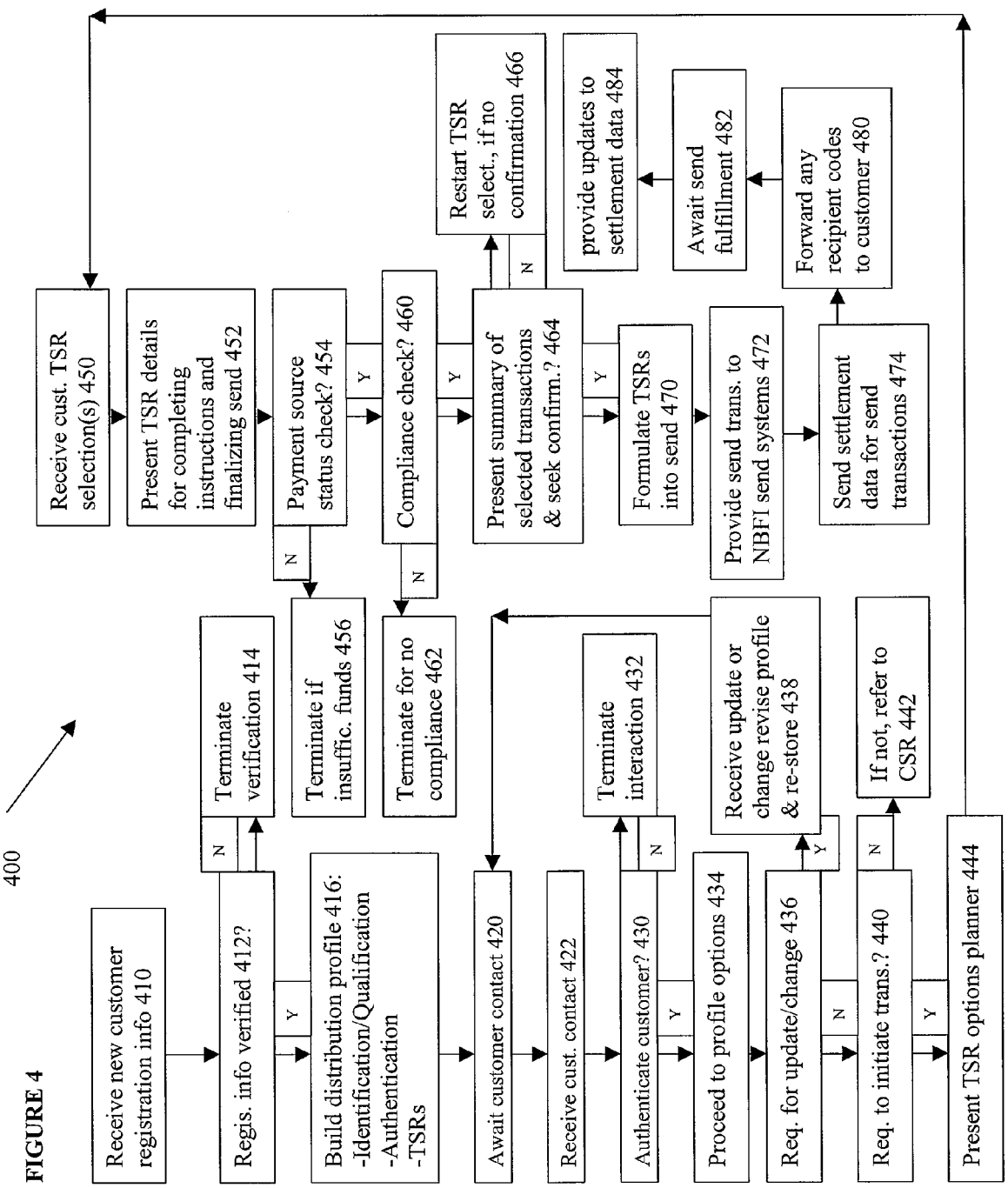
FIG. 4 is high level flowchart of the process for registering and accepting update and/or transaction instructions from a customer using the present system.

Method Overview. FIG. 4 is a flowchart 400 showing the operation of the present system with respect to a particular customer. At step 410, the system receives registration information from a new customer, which may come from the various access portals 20 shown in FIG. 1. At step 412, the system determines whether the registration information presented can be verified. If not, the registration process is terminated at step 414, or suspended if the customer might provide further information for successful verification. If verification is successful, the system begins to build a distribution profile 52 at step 416, by soliciting identification and qualification information and also the authentication information. Once these are adequately provided, the customer is asked to build one or more TSRs. Templates for gathering the required TSR data may be provided. Once the distribution profile is complete, the customer may proceed with a transaction or may change the distribution profile. This may be immediate or it may be later, thus, at step 420 the system awaits customer contact.

At step 422, the system receives customer contact and at step 430 the system asks for authentication data and checks to see if this customer can be authenticated. If not, then at step 432, the interaction is terminated. If authentication is successful, at step 434, the system presents the various profile options for the distribution profile. If at step 436, the customer selects the option to request a distribution profile update or change, the data for effecting the change are received and the distribution profile is revise and re-stored for later use, with a return to step 420 where the system awaits customer contact. If the system has not received a request for a distribution profile update or change, at step 440 the system checks to see if the customer has selected the option of requesting that a money transfer transaction be initiated. If not, the customer may be referred to a CSR to handle the issues raised by the customer. If the customer is requesting that a money transfer transaction be initiated, at step 444, the system presents the TSR options in the customer's distribution profile and, if the access portal permits, may present a planning tool. At step 450, the system receives the customer's TSR selection(s) and at step 452 the system presents the TSR details for completion of amount or other transaction details and for setting up receipt of customer confirmation that a money transfer as now defined by the TSR and the customer instructions is to proceed. At step 454, before finalizing the just-defined send, the system runs a payment source status check, which may include checking closed account lists, the actual balance available at the payment source 90 or other available funds or account data from the payment source 90. If this status check shows that there are not sufficient funds or the payment source 90 is otherwise not available, then the transaction is terminated at step 456, with a corresponding message. As an option (not shown), if there is a lesser amount of funds that is available, the customer can be presented an option to proceed with the transaction with a lesser send amount that is consistent with available finds.

If the funding source 90 will support the transaction, the system proceeds to step 460, where the compliance system 122 is applied to see if a transaction at the requested level is consistent with applicable compliance requirements. If this compliance check shows that there is a compliance problem, then the transaction is terminated at step 462, with a corresponding message. If the compliance check permits the transaction, the system proceeds to step 464, where the customer is presented a summary of the send amounts and/or payment amounts and fees for the customer selected transaction(s) and asked to approve and confirm the transaction(s). If no confirmation is provided, the customer can be redirected to a part of the process where the TSR selection options are again presented, such as step 444, or the interaction can be terminated. If confirmation is provided, the system takes the customer selected transactions as defined in the TSRs and customer instruction details provided to complete the transaction definition(s) and at step 470 formulates these into one or more send transaction records which at step 472 are provided to the NBFI send systems. Once the send transaction is finalized and sent off for execution, at step 474 the system passes the settlement data that follow from the transaction on to the settlement system 130. At step 480, the system forwards any transaction identifier codes to the customer, for communication to the recipient as needed. At step 482, the system awaits confirmation of fulfillment of the send transaction. At step 484, the system sends any updates to settlement data that may arise in connection with send transaction fulfillment on to settlement systems 130.

Figure 5A:
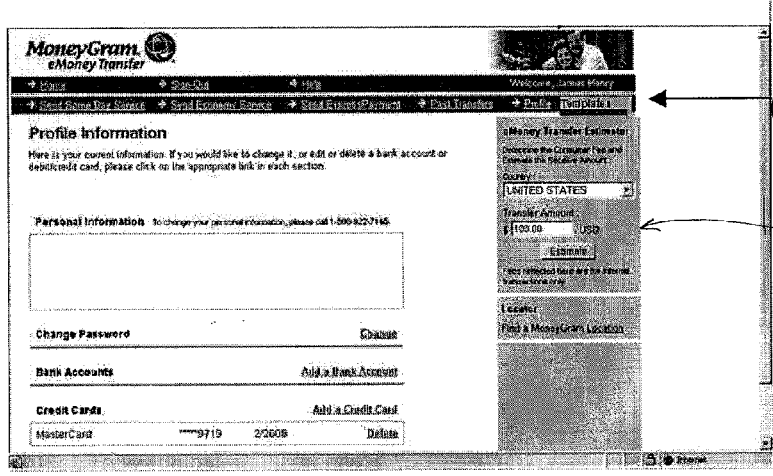
FIGS. 5a-5d are sample screens for an implementation of the system.
Figure 5B:
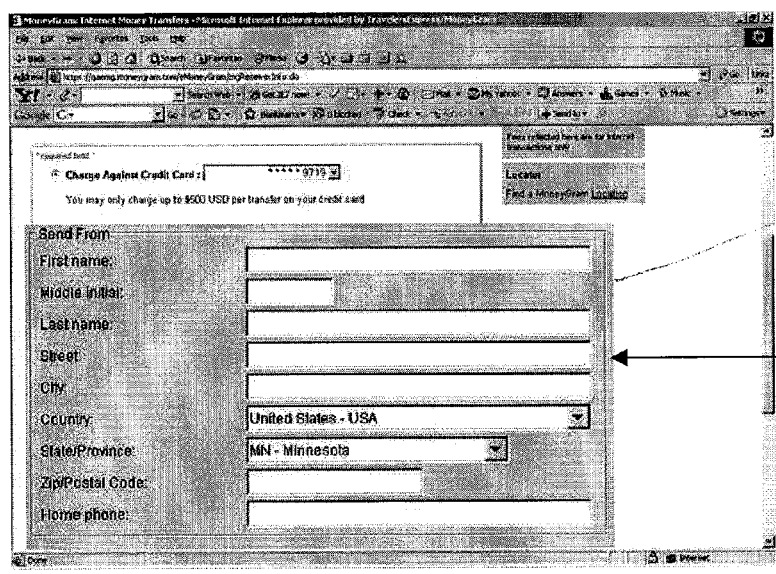
Figure 5C:
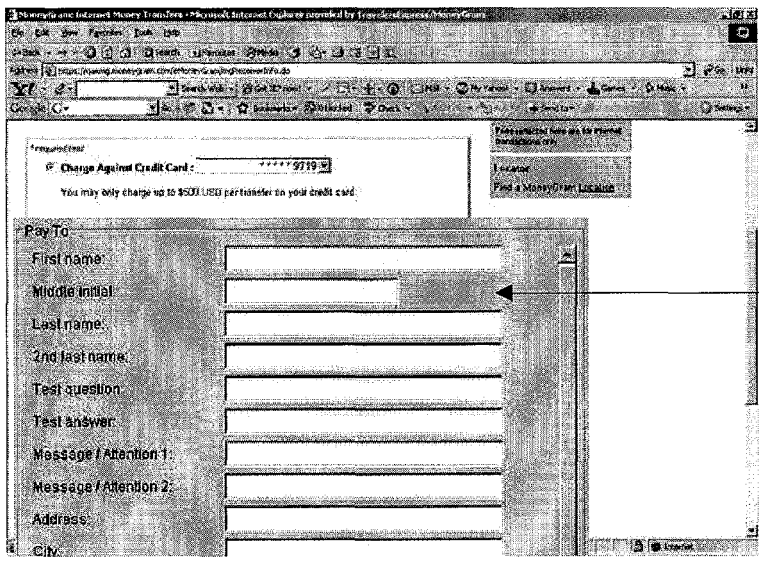
Figure 5D:
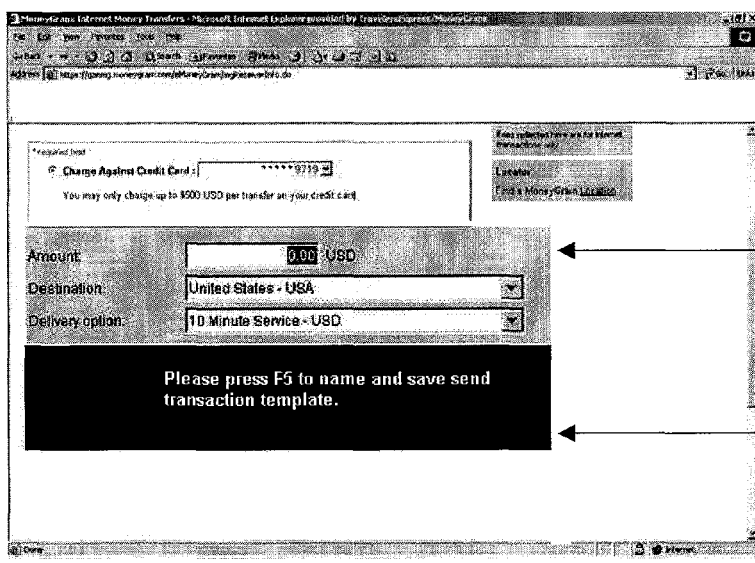

FIGS. 5a-5d are sample screens for an implementation of the method and system discussed above. FIG. 5a shows an opening screen 510 in which a customer may begin to build a distribution profile by use of a template. This screen calls for entry of personal information, bank accounts and credit cards as payment sources 90. (In other implementations, prepaid and debit cards may be shown as payment sources 90.) It also allows a password change to be initiated. FIG. 5b shows the sender side template 520 for formulating a TSR 60. It first asks for credit card information for a funding source 90 and then for sender information. After the first TSR 60 is formulated, this screen may be pre-populated. FIG. 5c shows the recipient side template 530 for formulating a TSR 60. This includes a customer-selected test question and test answer in addition to name and address fields. It also permits messages to be entered. FIG. 5d shows a screen 540 for selecting the amount, destination and delivery option parameters for a send transaction staged in a TSR 60. This screen also provides customer control for saving the TSR. Once this TSR 60 is saved, the distribution profile has a template for use whenever the customer wishes to select this send transaction as one to be executed. Typically, the customer would set up several of these for the customer's repeated send transactions. Slightly different screens may presented to create the template for a bill payment money transfer transaction.

Although the present invention has been described with reference to preferred embodiments, persons skilled in the art will recognize that changes may be made in form and detail without departing from the spirit and scope of the invention.

I claim:

1. A method of performing money transfer send transactions comprising:

receiving at a non-bank financial institution (NBFI) data center registration information from a customer, including customer identification and qualification information and payment source identification;

performing verification of at least a portion of the identification and qualification information and at least a portion of the payment source identification and upon sufficient verification building a distribution profile in memory at the NBFI data center;

receiving at the NBFI data center from the customer and storing in the distribution profile send transaction specifications to stage each of two or more proposed send transactions;

receiving from a remote user access portal communicating with the NBFI data center a send initiation instruction with associated customer authentication data and payment source identification and responsive thereto, identifying from the customer authentication data a distribution profile in memory at the NBFI data center and based on the send initiation instruction identifying at least one of the staged send transaction specifications from the identified distribution file to be executed; and responsive to the send initiation instruction, verifying the authentication data and the current status of the payment source identified in the distribution profile and upon sufficient verification, initiating a send transaction and a delivery of funds from a NBFI send system of the NBFI data center communicating with a non-bank agent network according to the at least one staged send transaction specification.

2. The method of claim 1 wherein the payment source identification comprises identification of a prepaid card account managed by a financial institution that also initiates the at least one send transaction.

3. The method of claim 1 further comprising providing the customer send transaction confirmation information including a transaction identifier to identify the send transaction.

4. The method of claim 1 wherein the step of receiving registration information comprises receiving payment source identification selected from the group consisting of: prepaid card identification, debit card identification, credit card identification, and bank account identification.

5. The method of claim 1 wherein the step of receiving a send initiation instruction comprises receiving associated customer authentication information for multifactor authentication.

6. The method of claim 5 wherein the customer authentication information is two or more of: a password, a PIN, a biometric identifier and a sending device identifier.

7. The method of claim 1 wherein the step of verifying the current status of the payment source comprises receiving status information selected from the group consisting of: closed account lists, account balance data and available funds data.

8. The method of claim 1 wherein the step of receiving send transaction specifications comprises storing a record for a proposed send transaction that makes a scheduled payment, including the payment schedule, and the step of receiving a send initiation instruction comprises receiving automated instructions generated in response to the payment schedule that identify a scheduled payment for a customer.

9. The method of claim 1 wherein the payment source identification identifies a prepaid card and further comprising means for receiving a transfer of funds to the prepaid card from a funding source selected from the group consisting of: cash, tax refunds, trust account funds, government program payments and government-facilitated payments.

10. The method of claim 1 wherein the step of receiving registration information comprises receiving information from a customer at an access portal in communication with the NBFI data center, selected from the group consisting of a telephone center, a web site and an agent terminal.

11. The method of claim 1 wherein the step of performing verification of at least a portion of the identification and qualification information and the payment source identification comprises verification of account-holder status using a micro-deposit.

12. The method of claim 1 wherein the act of building a distribution profile comprises building a distribution profile containing qualification information that varies according to the amount of a proposed send transaction and applicable compliance rules.

13. The method of claim 1 further comprising providing the customer an interactive distribution planner tool.

14. The method of claim 13 wherein the distribution planner tool presents at least one money transfer transaction option from the distribution profile.

15. The method of claim 13 wherein the distribution planner tool presents two or more money transfer transaction options from the distribution profile.

16. The method of claim 13 wherein the distribution planner tool performs calculations to aid a customer in allocating funds to two or more money transfer transactions.

17. A method of performing money transfer send transactions comprising:

receiving from a remote user access portal communicating with a non-bank financial institution (NBFI) data center a send initiation instruction with customer authentication data and a payment source identification and responsive thereto identifying from the customer authentication data a distribution profile for the customer in memory at the NBFI data center and selection information identifying at least one staged send transaction specification stored in the identified distribution profile to be executed, said distribution profile having been established by receiving in memory at the NBFI data center registration information from the customer, including customer identification and qualification information and payment source identification, by performing verification of at least a portion of the identification and qualification information and at least a portion of the payment source identification and upon sufficient verification, building the distribution profile at the NBFI data center by receiving at the NBFI data center from the customer and storing in the distribution profile send transaction specifications to stage each of two or more proposed send transactions; and responsive to the send initiation instruction, verifying the authentication data and the current status of the payment source identified in the distribution profile and upon sufficient verification, initiating a send transaction and a delivery of funds from a NBFI send system of the NBFI data center communicating with a non-bank agent network according to the at least one staged send transaction specification.

18. The method of performing a money transfer send transaction of claim 17 wherein the payment source identified comprises a prepaid card account managed by a financial institution that also initiates the at least one send transaction.

19. The method of claim 17 further comprising providing the customer send transaction confirmation information including a transaction identifier to identify the send transaction.

20. The method of claim 17 wherein the act of receiving registration information comprises receiving payment source identification selected from the group consisting of: prepaid card identification, debit card identification, credit card identification, and bank account identification.

21. The method of claim 17 wherein the step of receiving a send initiation instruction comprises receiving associated customer authentication information for multifactor authentication.

22. The method of claim 21 wherein the customer authentication information is two or more of: a password, a PIN, a biometric identifier and a sending device identifier.

23. A system for performing money transfer send transactions comprising:
- a component for receiving at a non-bank financial institution (NBFI) data center registration information from a customer, including customer identification and qualification information and payment source identification;
- a component for performing verification of at least a portion of the identification and qualification information and at least a portion of the payment source identification and upon sufficient verification building a distribution profile in memory at the NBFI data center;
- a component for receiving at the NBFI data center from the customer and storing in the distribution profile send transaction specifications to stage each of two or more proposed send transactions;
- a component for receiving from a remote user access portal communicating with the NBFI data center a send initiation instruction with associated customer authentication data and payment source identification and responsive thereto, identifying from the customer authentication data a distribution profile and based on the send initiation instruction identifying at least one of the staged send transaction specifications from the identified distribution profile to be executed; and
- a component responsive to the send initiation instruction, for verifying the authentication data and the current status of the payment source identified in the distribution profile and upon sufficient verification, initiating a send transaction and a delivery of funds from a NBFI send system of the NBFI data center communicating with a non-bank agent network according to the at least one staged send transaction specification.

24. The system of claim 23 wherein the payment source identification comprises identification of a prepaid card account managed by a financial institution that also initiates the at least one send transaction.

25. The system of claim 23 further comprising a component for providing the customer send transaction confirmation information including a transaction identifier to identify the send transaction.

26. The system of claim 23 wherein the component for receiving registration information comprises a component for receiving payment source identification selected from the group consisting of: prepaid card identification, debit card identification, credit card identification, and bank account identification.

27. The system of claim 23 wherein the component for receiving a send initiation instruction comprises a component for receiving associated customer authentication information for multifactor authentication.

28. The system of claim 27 wherein the customer authentication information is two or more of: a password, a PIN, a biometric identifier and a sending device identifier.

29. A computer readable storage medium encoded with computer program instructions for performing money transfer send transactions comprising:
- an instruction component for receiving at a non-bank financial institution (NBFI) data center registration information from a customer, including customer identification and qualification information and payment source identification;
- a instruction component for performing verification of at least a portion of the identification and qualification information and at least a portion of the payment source identification and upon sufficient verification building a distribution profile in memory at the NBFI data center;
- a instruction component for receiving at the NBFI data center from the customer and storing in the distribution profile send transaction specifications to stage each of two or more proposed send transactions;
- a instruction component for receiving from a remote user access portal communicating with the NBFI data center a send initiation instruction with associated customer authentication data and payment source identification and responsive thereto, identifying from the customer authentication data a distribution profile and based on the send initiation instruction identifying at least one of the staged send transaction specifications from the identified distribution profile to be executed; and
- a instruction component for responsive to the send initiation instruction, verifying the authentication data and the current status of the payment source identified in the distribution profile and upon sufficient verification, initiating a send transaction and a delivery of funds from a NBFI send system of the NBFI data center communicating with a non-bank agent network according to the at least one staged send transaction specification.

30. The computer readable storage medium of claim 29 wherein the payment source identification comprises identification of a prepaid card account managed by a financial institution that also initiates the at least one send transaction.

31. The computer readable storage medium of claim 29 further comprising an instruction component for providing the customer send transaction confirmation information including a transaction identifier to identify the send transaction.

32. The computer readable storage medium of claim 29 wherein the instruction component for receiving registration information comprises a component for receiving payment source identification selected from the group consisting of: prepaid card identification, debit card identification, credit card identification, and bank account identification.

33. The computer readable storage medium of claim 29 wherein the instruction component for receiving a send initiation instruction comprises a component for receiving associated customer authentication information for multifactor authentication.

34. The computer readable storage medium of claim 33 wherein the customer authentication information is two or more of: a password, a PIN, a biometric identifier and a sending device identifier.

* * * * *

UNITED STATES PATENT AND TRADEMARK OFFICE
CERTIFICATE OF CORRECTION

| | | |
|---|---|---|
| PATENT NO. | : 7,878,393 B2 | Page 1 of 1 |
| APPLICATION NO. | : 11/608040 | |
| DATED | : February 1, 2011 | |
| INVENTOR(S) | : James M. Henry | |

It is certified that error appears in the above-identified patent and that said Letters Patent is hereby corrected as shown below:

| Column | Line | | Should Read |
|---|---|---|---|
| 1 | 11 | common for finds to be | common for funds to be |
| 2 | 53 | form of finds, | form of funds, |
| 14 | 2-3 | with available finds. | with available funds. |

Signed and Sealed this
Fifth Day of April, 2011

David J. Kappos
*Director of the United States Patent and Trademark Office*